(No Model.)
C. S. SHARP.
SCRAPER MECHANISM FOR DISK HARROWS.
No. 539,551. Patented May 21, 1895.
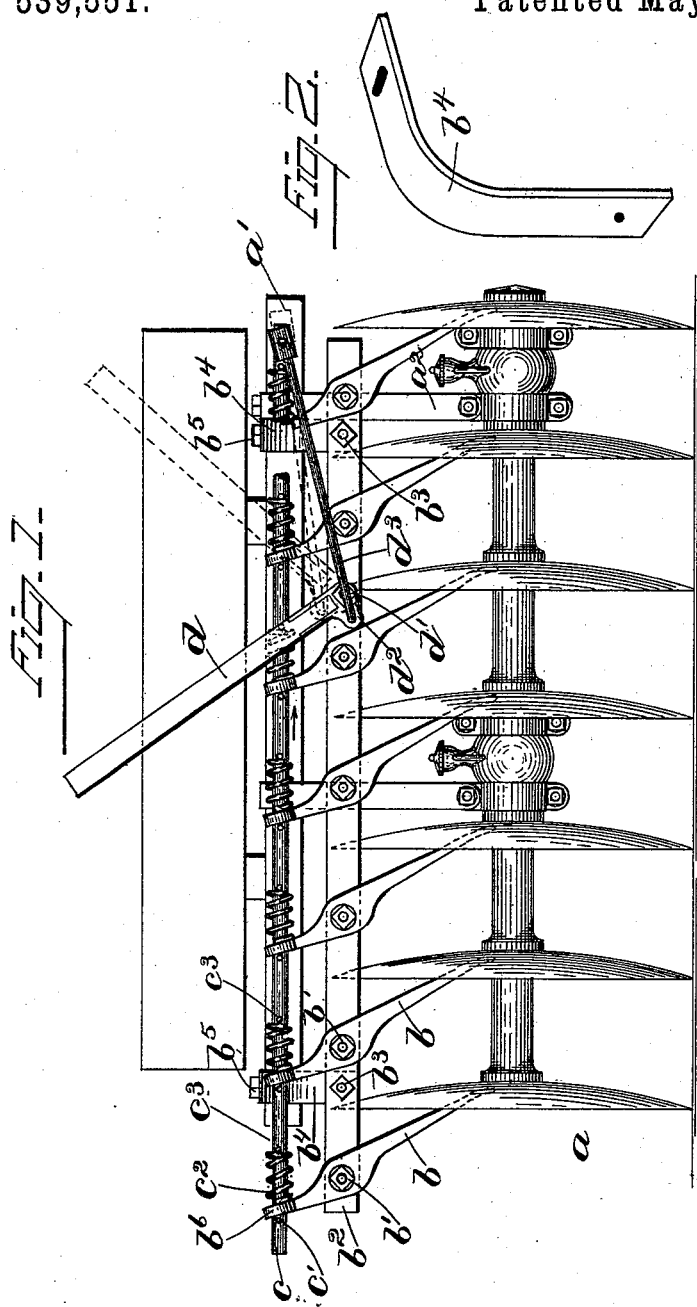

UNITED STATES PATENT OFFICE.

CHARLES S. SHARP, OF AUBURN, NEW YORK, ASSIGNOR TO THE D. M. OSBORNE & COMPANY, OF SAME PLACE.

SCRAPER MECHANISM FOR DISK HARROWS.

SPECIFICATION forming part of Letters Patent No. 539,551, dated May 21, 1895.

Application filed November 6, 1894. Serial No. 528,011. (No model.)

*To all whom it may concern:*

Be it known that I, CHARLES S. SHARP, of Auburn, county of Cayuga, State of New York, have invented an Improvement in Scraper Mechanism for Disk Harrows, of which the following description, in connection with the accompanying drawings, is a specification, like letters on the drawings representing like parts.

This invention relates to disk harrows, and has for its object to improve the construction of the scraper mechanism.

The invention consists in the combination with the gang beam of a disk harrow, a series of rotary disks secured to a shaft, having its bearings in brackets depending therefrom, a series of scrapers yieldingly connected to a longitudinally reciprocating bar, and a frame to which said scrapers are pivoted, which is attached to the gang beam in such manner as to be adjustable in the direction of the length of the gang of disks, so that the entire gang or series of scrapers may be simultaneously adjusted; also, in the combination of a series of rotary disks, a series of scrapers connected to a longitudinally reciprocating bar, a frame to which said scrapers are pivoted, and an operating device constructed and arranged to positively move the scrapers toward and from the disks, and also positively hold them in either position; also, in details of construction to be hereinafter set forth.

Figure 1 shows in rear side elevation a single gang of disks and scraper mechanism embodying this invention applied thereto, and Fig. 2 a perspective detail of one of the supporting-arms for the scraper mechanism.

The rotary disks $a$, secured to a shaft, the gang beam $a'$, and brackets or supports $a^2$, are or may be all as usual. A series of scrapers $b$, of any suitable form, and adapted when brought in contact with the disks $a$, to remove the material therefrom, are pivotally connected at $b'$ to a bar $b^2$, which is secured by bolts $b^3$, or otherwise, to the rear ends of arms or straps $b^4$, which are secured to the gang beam $a'$, by bolts $b^5$ or otherwise. The holes in the arms $b^4$ through which the bolts $b^5$ pass are elongated to permit the frame bar $b^2$, and scrapers which are pivotally connected thereto, to be bodily adjusted lengthwise the gang yet such bodily adjustment may be accomplished in other ways.

The scrapers $b$ project upwardly above the frame bar $b^2$, and said upper projecting ends are formed with eyes $b^6$. A rod or bar $c$ passes through the eyes $b^6$ of the scrapers, it being made smaller in diameter than the eyes in order that the scrapers may have a certain amount of independent motion. Pins $c'$ project from the rod or bar $c$ at one side of the upper end of the scrapers, so that as the bar $c$ is moved longitudinally in the direction of the arrow, all the scrapers will be withdrawn from contact with the disks, yet such movement of the scrapers is so materially assisted by their own gravitating action, that it is possible to omit such pins.

Spiral springs $c^2$ encircle the rod or bar $c$ at the opposite side of the upper end of the scrapers, being interposed between said upper ends and fixed pins $c^3$ projecting from the rod or bar, so that as said rod or bar is moved longitudinally in a direction opposite the arrow the pins $c^3$ will press the springs $c^2$ against the scrapers, and thereby move the scrapers in contact with the disks, although the springs permit said scrapers to yield. These springs $c^2$ normally exert no tension whatever on the scrapers, and are only brought into action when pressed by the longitudinal movement of the rod $c$ in a direction opposite the arrow.

A lever $d$ operated by foot or by hand, is pivoted at $d'$ to the frame bar $b^2$, and has a short crank arm or projection $d^2$, which is connected by a rod or link $d^3$ with the rod or bar $c$. The lever $d$, with its crank arm and connecting rod $d^3$, are so arranged that when the lever is in the full line position shown in Fig. 1, the rod or bar $c$ has been moved in the direction opposite the arrow, throwing the scrapers into engagement with the disks, and the crank is brought just to or beyond its dead center, so that the parts are thus positively held, without the employment of additional locking or detaining devices, and when so held the scrapers bear upon the disks in a yielding manner.

By throwing the lever $d$ into the position shown by dotted lines, Fig. 1, the bar $c$ will be moved in the direction of the arrow, and the scrapers withdrawn from engagement with the disks, and at such time the lever $d$, its crank arm, and connecting rod, are so disposed as to hold the scrapers in such position. It will therefore be observed that the lever $d$, its crank arm $d^2$, and connecting rod $d^3$, constitute an operating device for the scrapers, which has the function of moving the scrapers into contact with the disks and holding them in such position, and also withdrawing the scrapers from the disks and holding them in such position.

I claim—

In a disk harrow, the combination of the gang beam $a'$, a series of rotary disks secured to a shaft having its bearings in brackets depending from said gang beam, the frame bar $b^2$, bent arms $b^4$ secured to said gang beam, to which said frame bar $b^2$ is attached, a series of scrapers $b$ pivoted to said frame bar $b^2$ having upwardly extended ends, the bar $c$ to which the upper ends of said scrapers are yieldingly connected, hand operating lever $d$ pivoted at $d'$ to said frame bar, having the crank arm $d^2$, rod $d^3$ connecting said crank arm $d^2$ with the bar $c$, and operating in the manner shown and described to positively hold the scrapers in or out of engagement with the disks, substantially as described.

In testimony whereof I have signed my name to this specification in the presence of two subscribing witnesses.

CHARLES S. SHARP.

Witnesses:
 WALTER H. BECK,
 LINCOLN H. COWLES.